United States Patent [19]

O'Brien

[11] Patent Number: 5,005,961

[45] Date of Patent: Apr. 9, 1991

[54] DEVICE FOR CONVERTING A DISPLACEMENT IN A DIRECTION INTO A FORCE IN THE SAME DIRECTION

[75] Inventor: Michael J. O'Brien, Rochester, N.Y.

[73] Assignee: Eastman Kodak Company, Rochester, N.Y.

[21] Appl. No.: 452,892

[22] Filed: Dec. 19, 1989

[51] Int. Cl.$^5$ .......................... G02B 5/08; G02B 5/10; G02B 7/18

[52] U.S. Cl. .................................... 350/611; 350/607; 350/631; 350/321

[58] Field of Search ............... 350/607, 611, 327, 487, 350/636, 631

[56] References Cited

U.S. PATENT DOCUMENTS

| | | | |
|---|---|---|---|
| 3,063,670 | 11/1962 | Young | 248/358 |
| 4,060,315 | 11/1977 | Heinz | 350/289 |
| 4,295,710 | 10/1981 | Heinz | 350/310 |
| 4,538,882 | 9/1985 | Tanaka et al. | 350/255 |
| 4,596,444 | 6/1986 | Ushida | 350/247 |
| 4,664,488 | 5/1987 | Sawicki et al. | 350/611 |

Primary Examiner—Paul M. Dzierzynski
Assistant Examiner—James Phan
Attorney, Agent, or Firm—John B. Turner

[57] ABSTRACT

An active optical system is described which includes a mirror deformable by a force applied through a device for converting a displacement in a direction into a force in the same direction. A stepper motor is selectively driven to cause rotation of a nut which drives a shaft longitudinally. Linear displacement of the shaft is applied to force generating flexures which are guided in their flexing by guidance flexures. Force is applied to the mirror by the force generating flexures. The force is maintained even when the stepper motor is not energized. A load cell is interposed between the mirror and the force generating flexures. Signals from the load cell are fed back to a control system.

6 Claims, 4 Drawing Sheets 5,005,961

DEVICE FOR CONVERTING A DISPLACEMENT IN A DIRECTION INTO A FORCE IN THE SAME DIRECTION

BACKGROUND OF THE INVENTION

1. Field of the Invention

This invention relates to devices for converting a displacement in a direction into a force in the same direction.

2. Description Relative to the Prior Art

Situations are known to exist in which it is desirable to convert a displacement in a direction into a force in the same direction. An example of such a situation is a remotely controlled active optical system in which the optical character of the system is changed by deforming a surface of the system. For example, by changing the radius of curvature of a mirror, the optical character of the mirror is changed. If the force is applied directly by, for example, an electro-mechanical device, the power has to be kept on the device as long as it is desired for the force to be applied by the device.

SUMMARY OF THE INVENTION

It is an object of the present invention to provide an improved device for converting a displacement in a direction into a force in the same direction.

In accordance with the present invention there is provided a device which includes a plurality of sets of flexures, some of which are in the path between the displacement application and the force output and others of which serve to guide the force creating and transferring flexures.

BRIEF DESCRIPTION OF THE DRAWINGS

An embodiment of the present invention will now be described, by way of example, with reference to the accompanying drawings, in which.

DETAILED DESCRIPTION OF THE PREFERRED EMBODIMENT

The embodiment of the present invention now to be described is in an active optical system, that is, an optical system in which the shape of a surface of an optical element is changeable at will by the variation of a force acting on it. The force on the optical element is varied by a device for converting a displacement in a direction into a force in the same direction, in accordance with the present invention.

Figure 1:
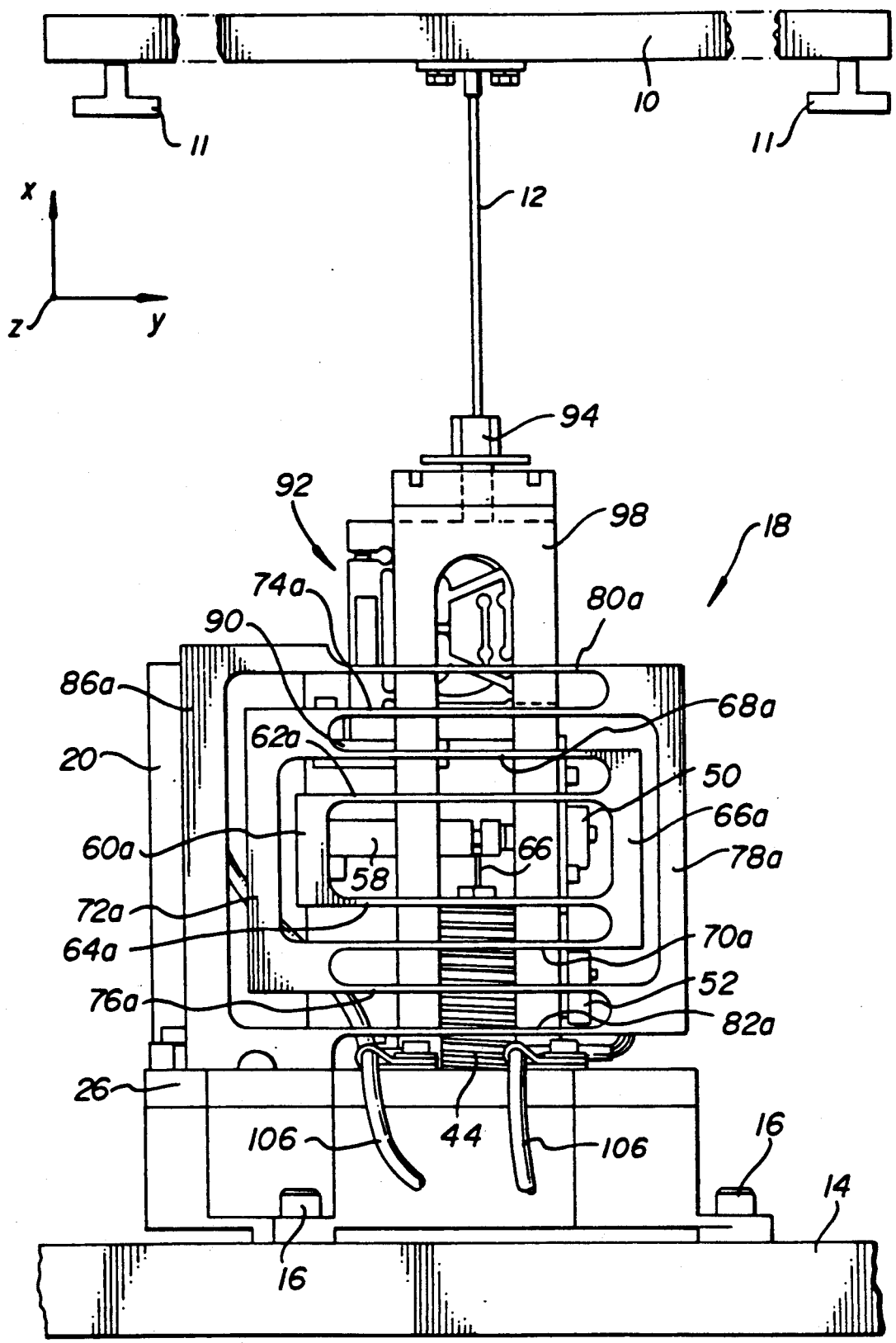
FIG. 1 is an elevational view of a an active optical system including a device, in accordance with the present invention, for applying a deforming force to a mirror.
Figure 2:
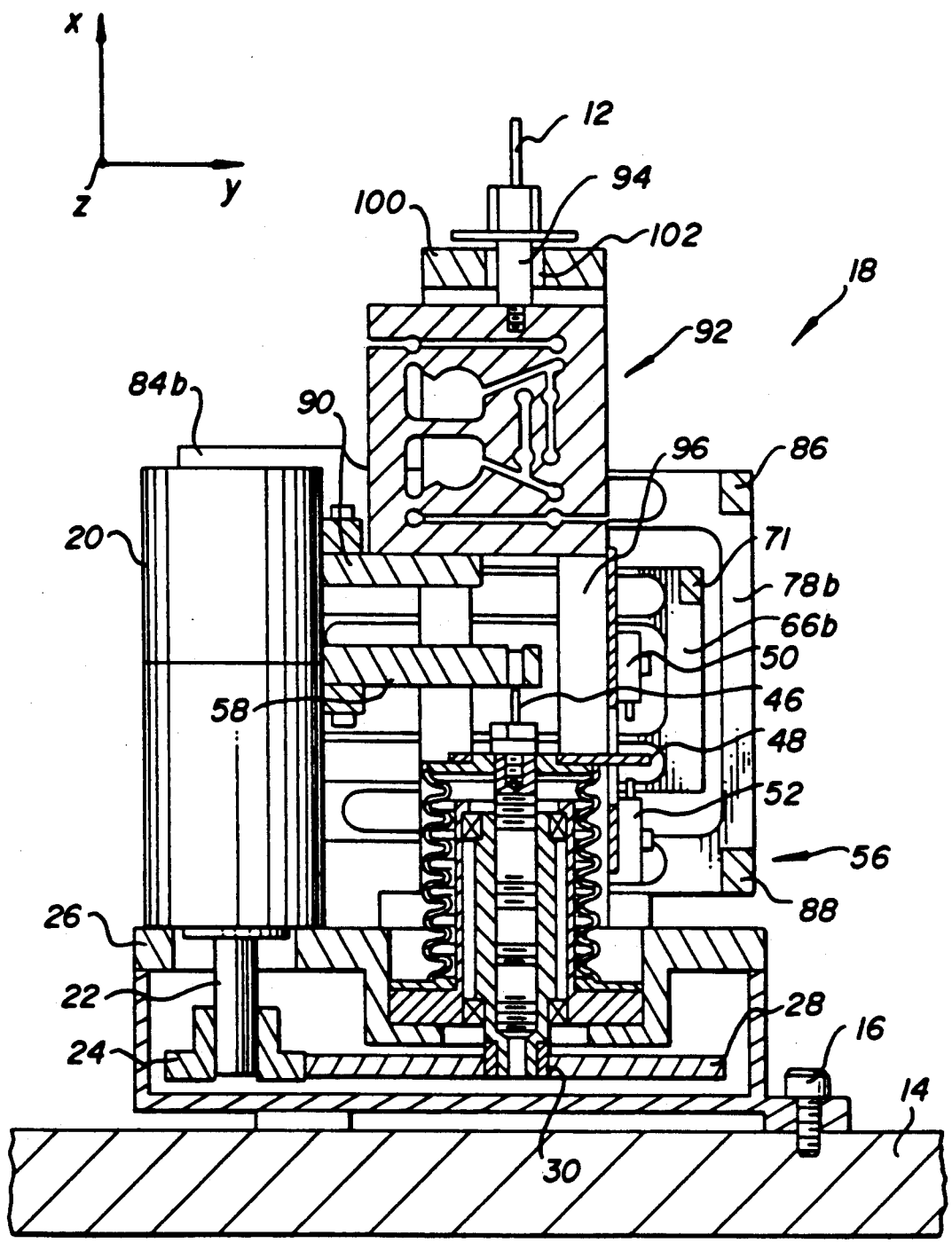
FIG. 2 is a sectional view, taken from the same direction as FIG. 1, but with the section being on a plane at the middle of the device, the mirror being omitted.
Figure 3:
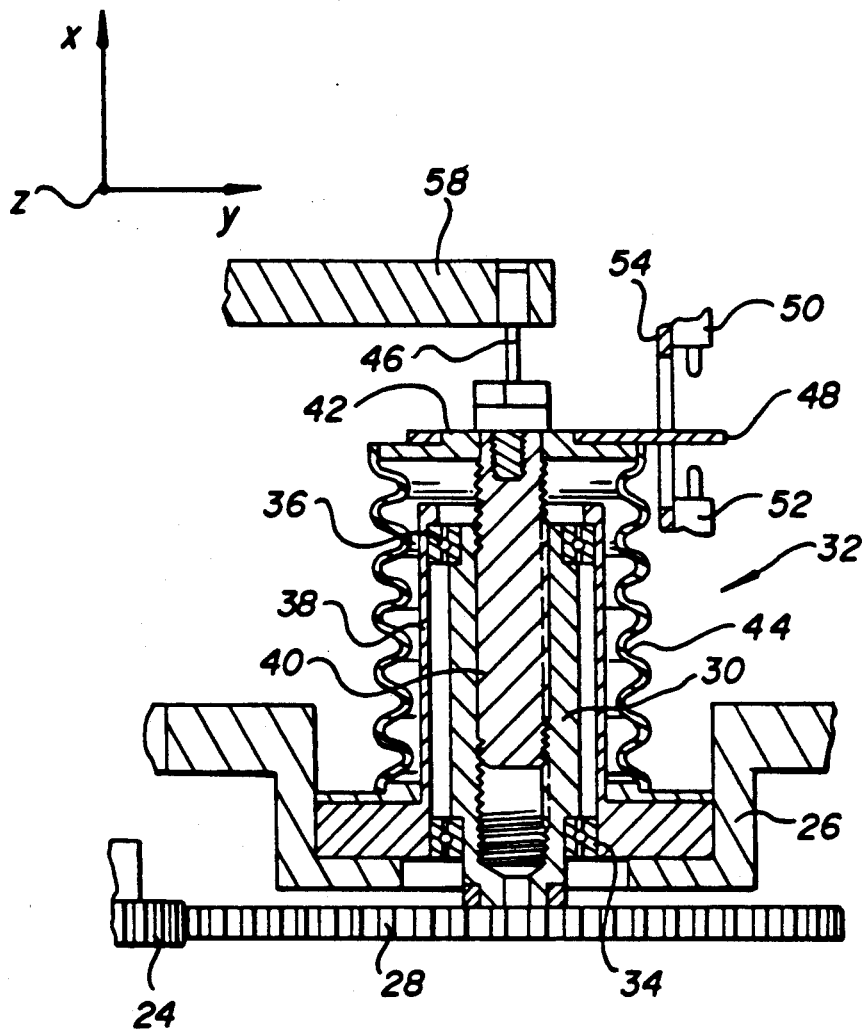
FIG. 3 is a sectional view of a portion of the device illustrated in FIGS. 1 and 2, on an enlarged scale.

In FIGS. 1 to 3, orthogonal x, y and z axes are indicated, consistently, to aid understanding and to facilitate description. The x axis is vertical; the y axis is horizontal and the z axis is perpendicular to the plane of the paper bearing the drawings.

The active optical system includes a mirror 10 having its general plane parallel to the yz plane. The mirror 10 is supported adjacent its periphery by support means 11 schematically represented in FIG. 1. The mirror 10 is deformable out of its general plane, in the x direction, by the application of force by a flexure 12 connected at one end to the rear of the mirror 10 and extending in the x direction.

The system also includes a base 14 parallel to the yz plane. The base 14 and the mounting means 11 are rigidly connected by means not illustrated. Mounted on the base 14, and secured thereto by studs 16, is a device 18 for converting a displacement into a force, in accordance with the present invention. The device 18 is connected to the end of the flexure 12 remote from the mirror 10 and serves to vary the force applied through the flexure 12 to the mirror 10.

The device 18 includes a rotary stepper motor 20 which includes a 60:1 reduction gear head. The gear head has a shaft 22 on which there is fixed a gear wheel 24 which has 96 teeth. The motor 20 is mounted on a frame 26 which is secured to the base 14. The gear wheel 24 is in mesh with another gear wheel 28 which is fixed to the rotary element 30 of a convertor 32 from rotary motion to linear motion. The gear wheel 28 has 300 teeth. The rotary element 30 is mounted in preloaded bearings 34, 36 which are both journal and thrust and are mounted in a tubular support 38 secured to the frame 26. The rotary element 30 is tubular and its internal surface is screw-threaded and threadedly engages a threaded shaft 40. In the present embodiment, the threads on shaft 40. In the present embodiment, the threads on the shaft 40 have a 0.025" pitch. The rotary element 30 forms nut means on the screw-threaded shaft 40. The upper end of the threaded shaft 40 extends upwardly beyond the upper end of the tubular support 38 and the rotary element 30. The projecting upper end of the shaft 40 carries an annular flange 42, the outer periphery of which is secured and sealed to the upper end of a tubular corrugated boot 44. The boot 44 extends downwardly around the outside of the tubular support 38 and is secured and sealed at its lower end to the frame 26. The boot 44 not only serves to keep dust out of the converter 32 but also serves to hold the shaft 40 against rotation. Thus, when the rotary element 30 is driven in rotation, the shaft 40 is held against rotation by the boot with the result that the shaft moves axially, in the x direction, by virtue of the screw-threaded engagement of the shaft and the rotary element. During this axial movement of the shaft 40 the boot 44 expands and contracts, axially, to accommodate axial movement of the shaft 40.

A flexure 46 has its lower end secured in the upper end of the shaft 40 and extends away therefrom, along the line of the axis of the shaft 40, in the x direction. The flexure 46 is aligned with the flexure 12.

A tongue 48 extends radially from the flange 42 and is positioned to engage an upper limit switch 50 and a lower limit switch 52 at extremes of upwards and downwards, respectively, travel of the shaft 40. The limit switches 50 and 52 are mounted on a frame member 54 which is an extension of the frame 26.

There will now be described the device 18, embodying the present invention, for converting a displacement of the flexure 46 into a force on the flexure 12. The device 18 includes force generation flexures which are in the path of force transmission to the flexure 12 ad guidance flexures which are not in the force transmitting path but just serve to guide components in the force transmitting path. The device 18 is symmetrical in front of and behind the xy plane containing the line of the flexures 12 and 46, which plane is the plane of the section of FIG. 2. The plane of FIG. 2 contains the line of the flexures 12 and 46 and only one half of the device 56 is visible in FIG. 2, the other half being in front of the xy plane of the paper bearing the drawing and being visible in FIG. 1. The half of the device visible in FIG. 1 will be given reference numerals with "a" suffixes and the identical half of the device, visible in FIG. 2, will be given the same reference numerals but with "b" suffixes. The "a" half of the device 18, visible in FIG. 1, will be described.

The upper end of the flexure 46 is secured to a transverse plate 58 which is T-shaped in plan and which bridges the "a" and the "b" halves of the device, that is, it is disposed in the yz plane and is extensive in the z direction. The plate 58 is connected at one end of the cross-piece of the T-shape to a floating spine member 60a and at the other end of the cross-piece of the T-shape to floating spine member 60b. The plate 58 and the spine members 60a and 60b form transfer means and serve to transmit motion of the flexure 46 in the x direction to the "a" and "b" halves of the force generating flexures. The spine members 60a and 60b are extensive in the x direction. At its upper end the spine member 60a is integral with an upper first force generation flexure 62a which is of leaf spring form with its plane in the yz plane and being extensive in the y direction. At its lower end the spine member 60a is integral with a lower first force generation flexure 64a which is also of leaf spring form with its plane in the yz plane and being extensive in the y direction. All of the force generation flexures and the guidance flexures are of leaf spring form with their planes parallel to the yz plane and are extensive in the y direction, when in the unstressed condition. Thus, these characteristics of the force generation and guidance flexures will not be repeated. The first upper and lower force generation flexures extend away from the spine member 60a in the rightwards direction as seen in FIG. 1 and when viewed in the y direction are located at the corners of a rectangle, in the present instance, a square.

At their right hand ends, the first upper and lower force generation flexures 62a and 64a are integral with a second floating spine member 66a. The second floating spine member 66a is extensive in the x direction and at its upper end, above the first upper force generating flexure 62a, is integral with a second upper force generating flexure 68a which extends in the leftwards direction away from the second floating spine member 66a. At its lower end, below the first lower force generating flexure 64a, the second floating spine member 66a is integral with a second lower force generating flexure 70a which extends leftwards away from the second floating spine member 66a. The second floating spine members are connected by a cross brace 71 which serves to prevent relative motion between the spine members 66a and 66b. The second upper and lower force generating flexures are located, when viewed in the y direction, at the four corners of a rectangle.

At their left ends, the second upper and lower force generating flexures 68a and 70a are integral with a third floating spine member 72a. The third floating spine member 72a is extensive in the x direction and at its upper end, above the second upper force generating flexure 68a, is integral with a first upper guidance flexure 74a which extends in the rightwards direction away from the third floating spine member 72a. At its lower end, below the second lower force generating flexure 70a, the third floating spine member 72a is integral with a first lower guidance flexure 76a which extends rightwards away from the third floating spine member 72a. The first upper and lower guidance flexures are located, when viewed in the y direction, at the four corners of a rectangle.

At their right hand ends, as seen in FIG. 1, the first upper and lower guidance flexures 74a and 76a, respectively, are integral with a floating guidance spine member 78a which is extensive in the x direction. At its upper end, above the first upper guidance flexure 74a, the spine member 78a is integral with a second upper guidance flexure 80a which extends leftwards away from the spine member 78a. At its lower end, below the first lower guidance flexure 76a, the spine member 78a is integral with a second lower guidance flexure 82a which extends leftwards away from the floating guidance spine member 78a. The second upper and lower guidance members are located, when viewed in the y direction, at the four corners of a rectangle.

At their left ends, the second upper and lower guidance flexure members 80a and 82a are integral with a stationary guidance spine member 84a which is secured to the frame 26. The guidance spine members 84a and 84 b form support means, for the force generation and guidance flexures, extensive in a plane parallel to the direction of the displacement and of the force applied to the mirror.

Upper and lower cross braces 86 and 88, respectively, extensive in the z direction, extend between and are secured to, the floating guidance members 78a and 78b.

A transverse plate 90, of T-shape in plan, having its general plane parallel to the yz plane and extensive in the z direction, is secured at the ends of the cross-piece of its T-shape form, to the third floating spine members 72a and 72b. The spine members 72a and 72b and the plate 90 form transfer means and the plate 90 forms the point for the device to apply the force converted by the device from a displacement. A load cell 92 is mounted on the plate 90 and extends upwards therefrom. A ferrule 94 extends upwards from the load cell 92 and at its upper extremity has secured to it the lower end of the flexure 12 which extends upwards to the underside of the mirror 10.

An inverted U-shape frame consisting of two legs 96 and 98 and a cross piece 100, is disposed between the two "a" and "b", halves of the device. The cross-piece 100 of the U-shape frame has an aperture 102 through which the ferrule 94 extends. The frame serves to limit movement of the ferrule in the yz plane and in the x direction, by engagement of the ferrule 94 with the cross-piece 100. Such limitation of the movement of the ferrule 94 prevents the device from being permanently deformed by excessive deflection and/or travel.

When viewed in the x direction, all of the "a" flexures are located behind one another in one xy plane and, similarly, all of the "b" flexures are located behind one another in another xy plane.

When viewed in the z direction, the flexures 12 and 46 are in a xz plane which intersects the force generating and guidance flexures at the middles of their lengths. When viewed in the y direction, the flexures 12 and 46 are in a xy plane which is equidistant from the force generating and guidance flexures in the "a" half and those in the "b" half.

The load cell 92 does not form part of the present invention and so is not described in detail. It may be any cell which will transmit a force in the same direction in which it is applied to it and which will provide signals indicative of the force it is transmitting. Signals are derived from the load cell 92 along cable 104, seen in FIG. 1. Another cable 106 leads to the stepper motor 20.

The guidance flexures, the force generation flexures and the spine members are all machined from a single piece of metal, which, in the present embodiment is 2024-T851 Aluminum.

Figure 4:
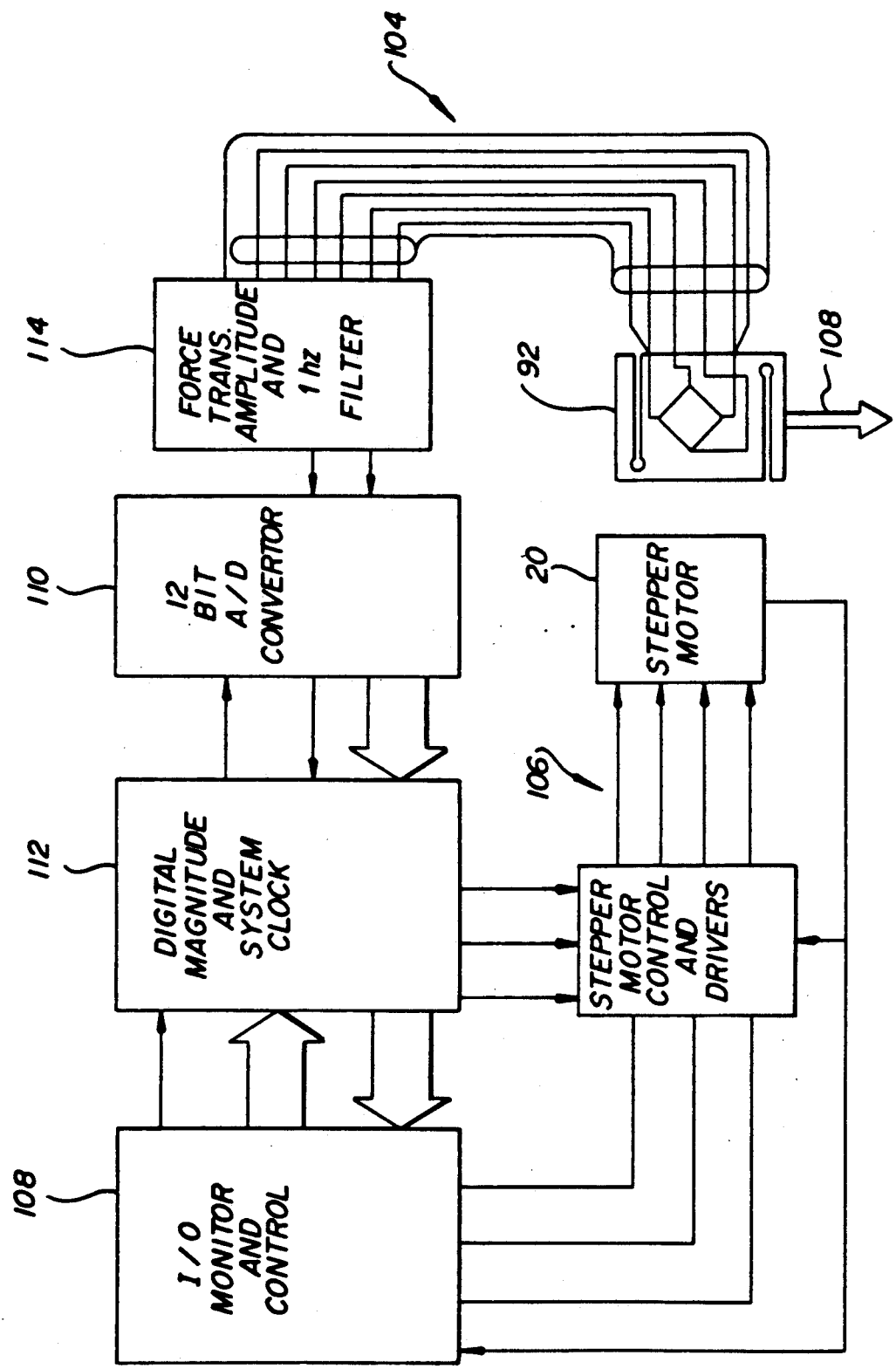
FIG. 4 is a schematic representation of a control circuit for the system illustrated in the foregoing Figures.

FIG. 4 is a block diagram of the control system. Arrow 108 represents the ferrule 94 which applies the force to the flexure 12. The force desired to be exerted by the flexure 12 on the mirror 10 is entered in input-/output monitor 108 by setting bit switches and pressing a set-up button. The i/o monitor and control 108 also monitors the analog to digital convertor 110 output as the stepper motor 20 operates. The monitor and control 108 also allows manual control by selecting manual mode. Twelve bits are used to represent a force, allowing any force between +/−2.000 pounds, in 0.001 pound increments, to be selected. Comparison of the input and output is performed digitally in magnitude comparator circuit 112 which provides direction signals and clock pulses for the motor control and driver based on the comparator status. If shaft 22 should tend to overtravel, the limit switch 50 or 52 causes the control 108 to go to manual mode. If this occurs, the shaft 22 is backed off under manual control, one step at a time, until it is back in range. System feedback is provided by the amplified and filtered signal from the load cell 92. A precision low drift excitation voltage for the strain guage bridge in the load cell 92 is supplied by the amplitude and filter device 114. Zero and full-scale calibration are achieved by adjusting offset and gain in the device 114 which then feeds the converter 110. The apparatus is zeroed and calibrated in its operating position to compensate for the weight of mirror isolation flexures (not shown).

When the stepper motor 20 is caused to step, the rotary motion is transmitted through its gear head to the shaft 22 which is caused to step in rotation and this causes, through gear wheels 24 and 28, the rotary element 40 to step in rotation. A rotational step of the rotary element 40 is converted into a linear step, in the x direction, by the converter 32. Let it be assumed that the linear step is an extension, that is, upwards. An upwards step of the shaft 40 is transmitted by the flexure 46 into an upwards displacement of the plate 58. The upwards displacement of the plate 58 carries with it the floating spine members 60a and 60b. Upwards displacement of the spine members 60a, 60b causes the upper and lower first force flexures 62a, 62b and 64a, 64b to flex. The upwards flexing of the flexures 62a, 62b and 64a, 64b causes the second floating spine members 66a and 66b to move upwards. Upwards movement of the spine members 66a and 66b causes the second upper and lower force generating flexures 68a, 68b and 70a, 70b to flex. Flexing of the flexures 68a, 68b and 70a and 70b applies an upwards force to the third floating spine members 72a and 72b which is directly transmitted to the plate 90 and thence through the load cell 92 to the ferrule 94 and the flexure 12 to the mirror 10. The application of force to the mirror 10 causes the mirror to change its shape. Because the change in force on the mirror is known, so also is the change is shape of the mirror.

The movement of the third floating spine members 72a and 72b is guided by the guidance flexures 80a, 80b and 82a, 82b and 74a, 74b and 76a, 76b so that all movements are strictly limited to occurring in defined xy planes.

As can be observed in FIG. 1, the effective lengths of all force generation and guidance flexures are the same. In this way, displacement in the y direction upon displacement in the x direction may be avoided.

It will be recognized that an active optical system as described above has the advantage that power is only consumed when it is desired to change the optical characteristic of the mirror. This is superior, in many applications, to an arrangement in which power has to be maintained as long as the mirror is to be deformed out of its natural condition. One embodiment of the present invention, as described above, it able to apply a force of +/−2.000 lbs with a resolution of 0.001 lb.

The invention has been described with particular reference to a presently preferred embodiment, but it will be understood that variations and modifications can be effected within the spirit and scope of the invention.

What is claimed is:

1. A device for converting a displacement in a direction into a force in the same direction, said device including;

support means extensive in a plane parallel to said direction, a first set of flexures, the flexures of the first set being of equal length and parallel to one another and each being attached at one end to said support means and extending, in the unflexed condition, generally perpendicular to said plane;

first floating spine means attached to the ends of said flexures remote from said support means;

a second set of flexures, the flexures of said second set being of equal length and parallel to one another and each being attached at one end to said spine means and extending generally parallel to the flexures of the first set towards said support means;

first transfer means attached to the ends of the flexures of the second set remote from said first spine means;

a third set of flexures, the flexures of the third set being of equal length and parallel to one another in the unflexed state and being attached at one end to said first transfer means and extending generally parallel to the flexures of the first and second sets towards said first floating spine means;

second floating spine means attached to the ends of the flexures of the third set remote from said first transfer means;

a fourth set of flexures, the flexures of the fourth set being of equal length and parallel to one another in the unflexed state and being attached at one end to said second floating spine means and extending generally parallel to the flexures of the first, second and third sets towards said first transfer means;

second transfer means attached to the ends of the flexures of the fourth set remote from said second floating spine means;

first means for applying a displacement to one of the first and second transfer means; and second means for applying a reaction to the other of the first and second transfer means;

the attachment of the flexures to the support means, the spine means and the transfer means being such, and the orientations of the flexures relative to the transfer means being such, that when a displacement is applied by the first means and a reaction is applied by the second means, the flexures of the third and fourth sets are caused to flex and movement of the second transfer means is guided by the first and second sets of flexures.

2. A device as claimed in claim 1, wherein each of said sets of flexures includes four flexures.

3. A device as claimed in claim 2, wherein the attachments of the flexures to the support means, the spine means and the transfer means are, in each case, located at the corners of a rectangle or regular trapezium.

4. A device as claimed in claim 2, wherein the flexures and the support means, the spine means and the transfer means are integral, having been machined from a single block of metal.

5. An active optical system including a device in accordance with any one of the preceding claims, and further including;
   a deformable mirror;
   means supporting said mirror; and
   motor means for selectively displacing said first means of said devices;
   said second means of said device being connected to said mirror and the support means of the device being connected to the means supporting the mirror.

6. An active optical system as claimed in claim 5, wherein said motor means includes a screw-threaded member connected to the first means of the device, means for constraining the screw-threaded member against rotational movement while allowing linear movement, nut means screw-threadedly engaged with the screw-threaded member, means constraining said nut means against linear movement but allowing rotational movement, and a rotary drive motors for selectively rotating said nut means.

* * * * *